Aug. 15, 1967  B. HURKO  3,336,465
DOMESTIC OVEN WITH SELF-CLEANING BOTTOM WALL
Filed Dec. 7, 1964
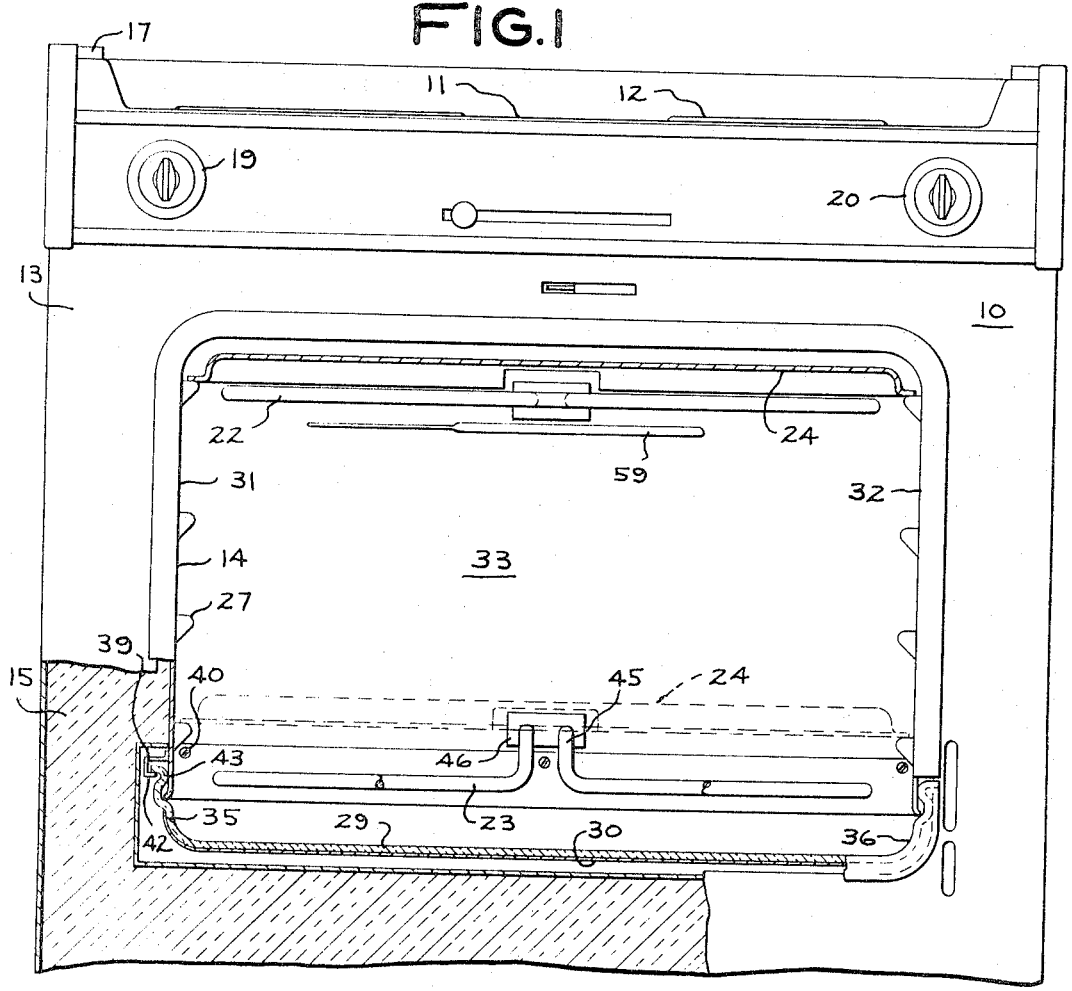
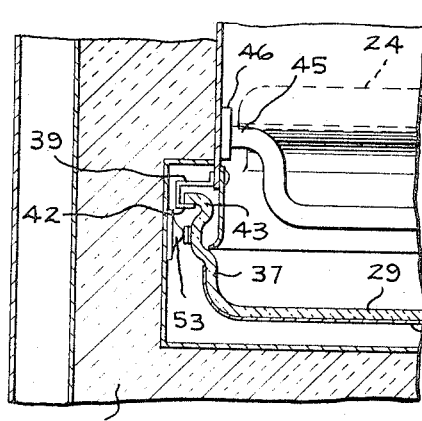
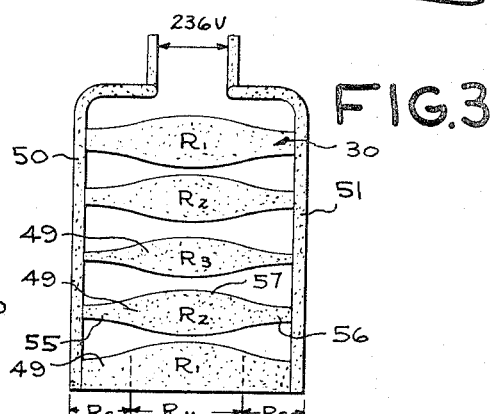
INVENTOR.
BOHDAN HURKO
BY Richard L. Caslin
HIS ATTORNEY

United States Patent Office 3,336,465
Patented Aug. 15, 1967

3,336,465
DOMESTIC OVEN WITH SELF-CLEANING
BOTTOM WALL
Bohdan Hurko, Louisville, Ky., assignor to General
Electric Company, a corporation of New York
Filed Dec. 7, 1964, Ser. No. 416,360
4 Claims. (Cl. 219—397)

ABSTRACT OF THE DISCLOSURE

A self-cleaning bottom wall of an enclosure forming an oven cooking cavity. The bottom wall is provided with an external film heater for use in raising the bottom wall temperature into a temperature range for cleaning food soil and grease spatter from the top surface of the bottom wall. The film heater is formed in a pattern with a plurality of generally parallel strips of conductive film where the strips are of varying cross-section to provide generally uniform temperature distribution with more heat being generated near the opposite sides and near the center of the bottom wall than at other portions of the bottom wall so as to compensate for heat losses in these areas.

---

The present invention relates to domestic ovens and particularly to a design of oven with external film heaters on the bottom wall of the oven liner for raising the temperature of the bottom wall to render this wall self-cleaning of food soil and grease spatter that accumulates thereon during normal cooking operations. Moreover, this invention encompasses a film heater design which is capable of compensating for heat losses from the oven cavity so as to maintain generally uniform temperature distribution throughout the bottom wall. Also a cover or shielding means is provided over the bottom wall during a cleaning cycle to retain the heat in the lower portion of the oven cavity and protect the temperature sensor of the oven thermostat from excessively high temperatures.

Probably the major annoyance to the housewife in using an oven is the difficulty encountered in keeping the walls of the oven liner clean. During the normal cooking operations food particles and grease spatterings often lodge on the hot oven surfaces where they are partially baked on. Hence, they not only discolor to a dark, burnt appearance, but what is far more objectionable, they adhere tenaciously to the surfaces. Strong chemical cleaning agents have been devised for application to the oven walls for loosening the food soils so that by alternate scraping and scrubbing the soil may be removed. Numerous other labor savers have been provided such as ovens with easily removable oven doors so as to render the soiled oven walls more accessible for cleaning. Moreover, sheets of aluminum foil covering the walls of the oven liner have been available as well as removable metal panels coated with a high temperature resinous coating sold under the trademark Teflon where the panels can be removed from the oven and easily cleaned in the kitchen sink.

A more positive and less laborious answer for solving this cleaning chore has been the recent introduction of a self-cleaning oven described and claimed in the recent Hurko Patent No. 3,121,158 which is assigned to the General Electric Company, the assignee of the present invention. In such an oven, the temperature is allowed to rise to above the normal cooking temperatures of between about 150° F. and 550° F. to a heat cleaning temperature range extending between about 750° F. and about 950° F. At these elevated temperatures the food soil will be decomposed or degraded, and the corresponding gaseous degradation products are first passed through an oxidation unit before being exhausted to the exterior of the oven cavity so as to avoid returning soot and obnoxious gases to the kitchen atmosphere. Such a self-cleaning oven design as is taught in the above-mentioned Hurko patent envisions an oven that is completely re-designed from a standard baking oven so as to derive the maximum benefits of the self-cleaning oven principles.

The present invention is concerned with simple modifications of the design of the standard baking oven to obtain the self-cleaning feature for the bottom wall of the oven liner because it collects the major portion of the food soil and grease spatter. This invention is not designed to clean the side walls, the back wall or top wall of the oven liner, but these only become lightly soiled and they may be cleaned easily using the available chemical cleaning agents. Moreover, this invention contemplates the concentration of the heat in the lower portion of the oven cavity during the cleaning cycle so as to prevent the oven air temperature from rising above about 600° F., so that the standard hydraulic oven thermostat may be used in this oven without the danger of its becoming overheated and perhaps destroyed.

The principal object of the present invention is to provide a domestic oven with a bottom wall having external film heaters usable during a heat cleaning cycle and capable of raising the bottom wall temperature in such a manner as to compensate for heat losses around the edges of the bottom wall so as to maintain generally uniform temperatures throughout the bottom wall.

A further object of the present invention is to provide an electric oven with an external film heater on the bottom wall thereof, where the heater comprises film strips of varying cross-section so as to generate more heat at the periphery of the heater and thereby maintain generally uniform temperatures over the bottom wall.

A further object of the present invention is to provide an electric oven of the class described with a heat-cleaning cycle during which a shielding means is positioned over the bottom wall as its film heater is energized so as to confine the heat generated by the film heater to the lower portion of the oven cavity so as to decompose the food soil and grease spatter that accumulates on the bottom walls.

A still further object of the present invention is to provide an inverted pan-shaped member as the shielding means for the bottom wall of the oven liner so as to insure that the oven air temperature does not rise above about 600° F., while the bottom wall temperature may reach as high as about 1100° F.

The present invention, in accordance with one form thereof, is embodied in a domestic oven having an insulated oven liner and an access door to form an oven cooking cavity. Standard heating means are provided for normal cooking operations. The bottom wall of the oven liner is provided with an external film heater for use during a heat cleaning cycle which generates more heat around the four sides thereof than at the center so as to compensate for heat losses in these areas and maintain generally uniform temperatures throughout the bottom wall. The oven cavity may include a standard hydraulic oven thermostat having a fluid-filled bulb in the top portion of the oven cavity. A removable shielding means is available for mounting over the bottom wall and confining the heat of the film heater mainly to the lower portion of the oven cavity; so that while the bottom wall may rise to a temperature approaching 1100° F., the oven air temperature and particularly the temperature of the hydraulic thermostat bulb will not rise above about 600° F. The particular film heater may comprise a plurality of parallel strips of conductive film formed on the underside of the oven bottom wall where the adjacent ends of the strips are connected together by a common terminal means and the ends of each strip are of reduced cross-section to be of higher resistance and hence higher wattage so as to generate more heat adjacent such ends.

My invention will be better understood from the following description taken in conjunction with the accompanying drawing and its scope will be pointed out in the appended claims.

FIGURE 1 is a front elevational view of a domestic electric range having a lower oven embodying the present invention, with the oven door removed and a part of the oven body broken away to show in cross-section the bottom wall of the oven liner supporting an external film heater.

FIGURE 2 is a fragmentary left side elevational view through the back wall of the oven showing electrical terminals of the film heater on the bottom wall of the oven liner, as well as the nature of the termination of the lower bake element.

FIGURE 3 is a lay-out of the pattern of one type of film heater to be applied to the bottom wall of the oven liner.

Turning now to a consideration of the drawing and in particular to FIGURE 1 there is shown for illustrative purposes a range body or cabinet structure 10 with a top cooking surface or cooktop 11 having a plurality of surface heating elements 12, and a baking oven 13 located beneath the cooktop and comprising an oven body supporting a box-like oven liner 14 with a front opening that is adapted to be closed by an access door (not shown). Thermal insulation such as fiberglass surrounds the oven liner and serves to retain much of the heat generated within the oven cavity. The side arms of the cooktop 11 include multiple selector switches 17 for controlling the power supply circuit to the surface heating elements 12. A standard electric oven is supplied with an upper broil element 22 and a lower bake element 23. Vertically spaced embossments 27 are formed on the opposite side walls of the oven liner to serve as support means for one or more removable oven racks which have not been illustrated for the sake of simplicity. The broil element 22 is combined with a removable reflector pan 24 that overlies the same, and this reflector pan is shown supported from the side embossments 27 of the oven liner 14. The front edge of the cooktop 11 includes an oven selector switch 19 and an oven thermostat 20 for controlling the wattage and temperature level of the oven heating units.

The principal point of novelty in the present invention centers around the construction of the bottom wall 29 of the oven liner 14 which is formed with an external film heater 30 that nearly covers the entire area thereof so as to generate generally uniform temperatures over the bottom wall. The standard oven liner is usually formed of sheet steel that is coated with an inner layer of porcelain enamel. However, the bottom wall of the present invention is preferably made of a high temperature, high resistivity dielectric base material such as is sold under the trademarks of Vycor or Pyroceram. For ease in attaching this bottom wall 29 to the steel oven liner 14, the oven liner is formed in the usual manner except minus a bottom wall. The bottom wall 29 is formed as a separate piece with a shallow pan-shape having side flanges 35 and 36 as seen in FIGURE 1 as well as a back flange 37 illustrated in FIGURE 2. The front flange is not shown but it would be turned down rather than up so as to present a smooth transition with the oven body.

Some means must be provided for attaching the bottom wall 29 to the bottom edge of the steel oven liner 14. This means is represented by an outer trim strip 39 in the form of a three-sided frame member of channel shaped cross-section that encompasses the outside of the oven liner and is attached thereto by fastening means 40 at spaced points around the oven liner. This trim strip 39 has a lower portion with an inwardly directed ledge 42 for supporting an outwardly turned lip 43 that is formed on the two side flanges 35 and 36 and the back flange 37 of the bottom wall 29.

Notice in FIGURE 2 that the bake element 23 has a terminal end 45 of non-standard configuration since it is offset upwardly to avoid interfering with the trim strip 39. The bake element 23 is supported from an electrical connector 46 that lies above the outer trim strip 39. It remains important that the bake element 23 be closely spaced from the bottom wall 29 of the oven liner. Hence the function of the offset terminal portion 45 of the bake element is to provide a high support point for the bake element, while retaining the major portion or heated portion of the bake element closely positioned with respect to the bottom wall 29 of the oven liner.

FIGURE 3 shows one example of the pattern or layout of the film heater 30 as it is formed on the underside of the bottom wall 29. The film heater comprises a plurality of parallel heater strips 49 of high temperature metallic film such as tin oxide or a gold-platinum layer as is taught in the recent Hurko, Patent No. 3,067,315. They are labelled in the following sequence $R_1$, $R_2$, $R_3$ $R_2$ and $R_1$. The adjacent ends of the strips 49 are connected together by a common terminal means or electrodes 50 and 51 respectively thereby forming a resistance heater circuit comprising a plurality of parallel resistances 49 connected across the electrodes 50 and 51. The electrodes are of special noble metals such as silver or platinum in order to prevent film failures due to arcing conditions that are experienced at the film terminations. It is the intention of the present invention to fashion the heater strips 49 by varying the cross-sectional area of certain portions thereof so as to generate varying amounts of heat so as to compensate for heat losses in the front portion of the bottom wall of the oven liner adjacent the access door, as well as adjacent the four corners of the bottom wall. For example, the film strips 49 extend from side to side of the bottom wall 29. One electrode 50 is located adjacent the left side wall 31 of the oven liner and it extends around to adjacent the back wall for engaging the electrical contact member 53 as is best seen in FIGURE 2. Moreover, the other electrode 51 is adjacent the right side wall 32 and it also extends around to the back of the oven liner. Each heater strip 49 is shown as being of a reduced cross-section at the ends as at 55 and 56. Thus, the electrical resistance at each end of the heater strip is higher than at the center 57 thereby producing a higher wattage according to the formula $W=I^2R$. Moreover, the central heater strip $R_3$ is of the smallest width. The two adjacent heater strips $R_2$ are slightly wider, and the two endmost strips, $R_1$ are of the greatest widths. The resistance $R_1$ is less than the resistance $R_2$, which is less than the resistance $R_3$. Similarly the current $I_1$ is greater than the current $I_2$, which is greater than the current $I_3$.

As mentioned previously the oven is provided with an oven thermostat 20, and the standard type is a hydraulic thermostat using a temperature sensing bulb 59 located adjacent the back wall 33 of the oven liner in the top portion of the oven cavity slightly below the broil unit 22. This bulb 59 carries a temperature sensitive fluid such as phenyl di-phenyl chloride which is only usable at temperatures below about 600° F. Thus it is imperative to protect this bulb 59 from excessive temperatures, while allowing the temperature of the bottom wall 29 of the oven liner to operate at temperatures approaching 1000° F. Such a protective measure is afforded by a cover or shielding member such as the reflector pan 24 shown in FIGURE 1 supported on the lower embossments 27 of the side walls 31 and 32 of the oven liner. This shield 24 would serve to confine the heat in the lower portion of the oven cavity so that a much shorter heating cycle would be possible in order to attain the proper temperature to degrade the food soil and grease spatter.

In the event this invention were used for cleaning a heavy soil load from the bottom wall 29 of the oven liner it would be important to provide the oven with an oxidation unit such as the catalytic smoke eliminator that is taught by the Welch Patent No. 2,900,483 for the reasons as given in the aforementioned Hurko Patent 3,121,158. It is conceivable that the film heater 30 might be substituted in place of the standard bake element 23 for normal baking operations. Also, other walls of the oven liner could be supplied with an external film heater in the manner of the heated bottom wall 29 described as one example of a practice of the present invention.

One manner of avoiding excessive smoking during the heat cleaning cycle would be to energize the film heater during all cooking operations at a low voltage of about 118 volts. In this manner the food soil and grease will release its gaseous products during each cooking operation but in small amounts which could easily be handled by the catalytic oxidation unit. Thus, very little smoking will occur during the heat cleaning operation when the film heater would normally be energized at 236 volts. Also, it might be desirable to connect the film heater 30 with an oven timer so that the length of the cleaning cycle could be pre-set to shut-off automatically according to the amount of soil accumulation.

Modifications of this invention will occur to those skilled in this art, therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. An electric oven comprising an oven body having an insulated oven liner and a front-opening access door that form an oven cooking cavity, heating means for said cavity including an upper broil element and an external film heater on a bottom wall of the oven liner that are adapted to be connected to a source of electrical energy, said film heater having a plurality of parallel strips of conductive film extending from side to side of the oven cavity with the adjacent ends of the strips being joined together with a common terminal means, most of the strips having end portions of reduced widths for increased electrical resistance and higher wattage so as to generate more heat at the side portions of the bottom wall of the oven liner, the heater strips adjacent the center of the bottom wall being of greater effective resistance than at the front and back of the bottom wall so as to pull more current through the front and back strips and compensate for heat losses around the four sides of the oven bottom wall and obtain generally uniform temperature distribution throughout the bottom wall.

2. An electric oven comprising an oven body having an insulated oven liner and an access door that form an oven cooking cavity, heating means for said cavity including an upper broil element, a lower bake element and an external film heater located on a bottom wall of the oven liner, said heating means being adapted to a source of electrical energy, a hydraulic thermostatic control system for the oven including a temperature sensing bulb positioned within the top portion of the oven cavity, oven rack support means on the opposite side walls of the oven liner, and a removable shielding means supported by the lower rack support means over the bottom wall when the external film heater is to be energized so as to confine the heat generated by the film heater to the lower portion of the oven cavity and decompose any food soil and grease spatter that accumulates on said bottom wall without overheating the thermostat bulb.

3. An electric oven as recited in claim 4 wherein the film heater comprises a plurality of parallel strips of conductive film extending from side to side of the oven cavity where the adjacent ends of the strips are joined together by a common terminal means, most of the strips having end portions of reduced widths for increased electrical resistance and higher wattage so as to generate more heat at the side portions of the bottom wall of the oven liner, the heater strips adjacent the center of the bottom wall being of greater effective resistance than at the front and back of the bottom wall so as to pull more current through the front and back strips and compensate for heat losses around the four sides of the oven bottom wall and obtain generally uniform temperature distribution throughout the bottom wall.

4. An electric oven as recited in claim 3 wherein the said shielding means is an inverted pan-shaped member which covers nearly the entire bottom wall of the oven liner and insures that the oven air temperature does not rise above about 600° F. while the bottom wall temperature reaches as high as about between 750° F. and 1100° F.

References Cited

UNITED STATES PATENTS

| | | | |
|---|---|---|---|
| 1,110,532 | 9/1914 | Byce | 338—218 X |
| 2,557,983 | 6/1951 | Linder | 219—543 |
| 2,678,990 | 5/1954 | Quirk | 219—406 |
| 2,710,900 | 6/1955 | Linder | 219—543 |
| 3,067,315 | 12/1962 | Hurko | 219—543 |
| 3,121,158 | 2/1964 | Hurko | 219—397 |
| 3,143,638 | 8/1964 | Scott | 219—395 |

RICHARD M. WOOD, *Primary Examiner.*

C. L. ALBRITTON, *Assistant Examiner.*

UNITED STATES PATENT OFFICE
CERTIFICATE OF CORRECTION

Patent No. 3,336,465                          August 15, 1967

Bohdan Hurko

It is hereby certified that error appears in the above numbered patent requiring correction and that the said Letters Patent should read as corrected below.

Column 6, line 16, for the claim reference numeral "4" read -- 2 --.

Signed and sealed this 25th day of June 1968.

(SEAL)
Attest:

Edward M. Fletcher, Jr.                        EDWARD J. BRENNER

Attesting Officer                               Commissioner of Patents